Aug. 28, 1956 — G. A. LYON — 2,760,829
WHEEL COVER
Original Filed Sept. 10, 1949
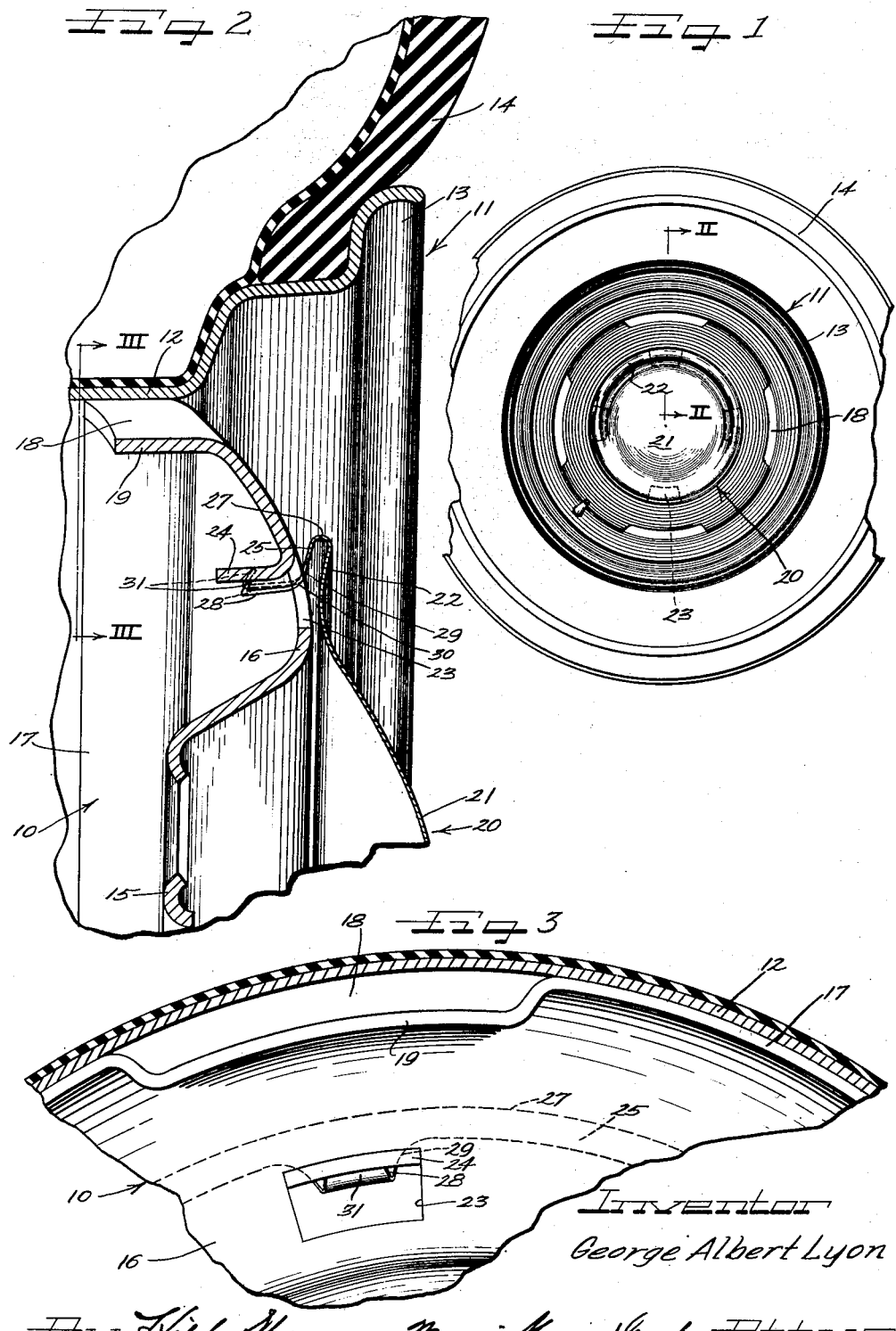
Inventor
George Albert Lyon

United States Patent Office 2,760,829
Patented Aug. 28, 1956

2,760,829

WHEEL COVER

George Albert Lyon, Detroit, Mich.

Original application September 10, 1949, Serial No. 115,089. Divided and this application January 14, 1954, Serial No. 404,035

6 Claims. (Cl. 301—37)

This application is a division of my copending application Serial No. 115,089, filed September 10, 1949, now abandoned.

The present invention relates to improvements in wheel structures and more particularly concerns novel means for protectively and ornamentally covering the outer sides of vehicle wheels.

An important object of the present invention is to provide an improved wheel structure in which a cover for the outer side of the wheel is retained on the wheel in a novel manner.

Another object of the invention is to provide an improved wheel structure having novel means thereon for attachment thereto of a wheel cover.

A further object of the invention is to provide an improved wheel structure including a cover arranged for press-on pry-off attachment to the wheel.

Still another object of the invention is to provide such a wheel structure in which the wheel cover is effectively retained against turning on the wheel.

Yet another object of the invention is to provide a wheel structure wherein a cover is provided with improved means for prying the same free from the wheel.

Other objects, features and advantages of the present invention will be readily apparent from the following detailed description of a preferred embodiment thereof taken in conjunction with the accompanying drawing, in which:

Figure 1 is an outer side elevational view of a vehicle wheel embodying features of the present invention;

Figure 2 is an enlarged radial fragmentary sectional view taken substantially on the line II—II of Figure 1; and Figure 3 is a fragmentary rear sectional and elevational view taken substantially on line III—III of Figure 2.

A wheel structure embodying the present invention includes a wheel body 10 and a tire rim 11, both of which are adapted to be made from appropriate gage sheet metal, the body being stamped to form to provide a disk type of wheel spider structure, and the tire rim being rolled to shape. The tire rim is preferably of the multi-flanged, drop-center type including a base flange 12 and a generally stepped outer side flange structure including a terminal flange 13 and arranged to support a pneumatic tire and tube assembly 14.

The wheel body 10 includes a central bolt on flange 15 by which the wheel is adapted to be attached to an axle structure of a vehicle including a brake drum which is in assembly generally encompassed by the wheel as is known practice. An annular axially outwardly projecting reinforcing nose bulge 16 on the wheel body encircles the bolt-on flange which thus appears as centrally dished within the nose bulge. At its outer margin the wheel body 10 has a marginal generally axially extending attachment flange 17 which is secured as by welding or riveting to the base flange 12 of the tire rim.

The attachment flange 17 is formed at appropriate intervals, such as at four equally spaced intervals with wheel openings 18 defined by inset flange portions 19 which are shaped to extend generally axially inwardly and are transversely arcuate concentric with the wheel axis. The inset flange portions 19 afford substantial reinforcement at the radially inner sides of the wheel openings 18 for the wheel body.

For protectively and ornamentally covering the outer side of the wheel, a wheel cover 20 is provided which is preferably of the type made from a single sheet metal blank and which may be dimensioned to extend in substantial concealing relation to the outer side of the wheel body 10. For this purpose the wheel cover includes a central convex crown portion 21 and an integral outer marginal portion 22 formed in one piece with the crown portion.

For attachment of the cover 20 to the wheel, the wheel body 10 is formed in the nose bulge portion 16 thereof with an intermediate annular series of spaced apertures 23 defined at one radial side as for example at the radially outer side thereof by an integral axially inwardly extending reinforcing and cover retaining flange 24.

The annular marginal portion 22 of the cover is of concave cross section having the outer extremity thereof turned under to provide an annular generally radially and axially inwardly extending reinforcing flange 25 merging with the outer portion of the margin 22 on a short radius round juncture rib 27 providing the margin of the cover with a strongly reinforced generally radially and axially outwardly extending marginal rib which in assembly with the cover diverges from the opposing radially outer side portion of the nose bulge 16. This affords a space or radially outward opening gap between the edge of the cover and wheel body for application of a pry-off tool.

For retaining the cover 10 on the wheel, the underturned marginal flange 25 is provided with an appropriate series of retaining fingers 28, one of such fingers being provided for each of the wheel body openings 23 and being adapted to engage retainingly with the flanges 24.

Each of the retaining fingers 28 includes a relatively wide base portion 29 extending generally in the plane of the underturned flange 25 to merge on a radius shoulder 30 with the principal body portion of the retaining finger which, in the detached condition of the cover, extends generally axially inwardly as shown in dash outline in Figure 2 on the circumference of a circle which closely approaches the inner surface of the retaining flange 24. The body portion of the retaining finger extends axially inwardly to a sufficient length to afford engagement with the retaining flange 24 at a substantially axially inwardly spaced point by means of a short generally radially and axially outwardly extending retaining terminal flange 31. By reason of its shortness and width the terminal flange 31 is quite stiff and is further stiffened by the juncture bend or rib with the end portion of the finger 28.

In applying the cover 10 to the wheel, the retaining fingers 28 are generally centered with respect to the openings 23 and the retaining finger terminal flanges 31 are cammed against the rounded, lead-in surface shoulders provided by the juncture of the respective retaining flanges 24 with the wheel body. Axially inward pressure against the cover causes the retaining terminal flanges 31 to cam inwardly along the retaining flanges 24 until the body portions of the fingers 28 are flexed radially inwardly and placed under substantial resilient tension working radially outwardly against the tips of the retaining finger terminal flanges 31 acting in gripping retaining engagement against the opposing surfaces of the respective retaining flanges 24.

It will be observed that as the fingers 28 are flexed radially inwardly from their tip portions, the fingers are tilted radially inwardly and thus cause the tips of the retaining flange terminals 31 to tilt into more direct endwise retaining engagement with the opposing flanges 24 of the wheel body. As a result the retaining fingers 28 retain the cover 10 quite firmly on the wheel, but since the retaining finger terminals 31 are held under resilient pressure engagement against the flanges 24 and therefore do not bite into the surface of the flange to any appreciable extent, the cover can readily be pried free from the wheel by the application of pry-off force to the generally radially outwardly projecting reinforcing margin of the cover which, as will be observed, substantially conceals the openings 23.

Resilience of the retaining fingers 28 is enhanced by the generally tapering sides thereof by which the base portions of the fingers are substantially wider than the tip portions of the fingers, and further by the generally angular longitudinal formation of the fingers and also by having the fingers transversely bowed generally conforming to the circularity of the wheel and cover.

It may be observed that by the particular construction and relationship wherein the outer margin of the cover 10 is retained in spaced relation to the radially outer sides of the openings 23, additional air circulation through the wheel body is afforded supplementary to the circulation through the wheel openings 18. Furthermore, the flanges 24 at the openings 23 reinforce the wheel body so that possible weakening of the wheel body by reason of the apertures 23 is overcome.

Should there be any tendency for the cover to turn relative to the wheel, in service, the retaining fingers 28 extending through the apertures 23 will prevent such turning by engagement of the edges of the fingers with the peripherally directed edges defining the apertures 23.

It will be understood that modifications and variations may be effected without departing from the scope of the novel concepts of the present invention.

I claim as my invention:

1. In a wheel structure including a tire rim and a load sustaining body of the disk spider type, the body having wheel openings adjacent the tire rim for air circulation therethrough and also having additional openings in an intermediate annular portion thereof affording additional circulation through the wheel body, each of said additional openings being defined at one radial side thereof with a reinforcing generally axially inwardly extending flange, and a cover for the outer side of the wheel having generally axially inwardly extending retaining fingers thereon retainingly engaging with said flanges at the additional wheel body openings and retaining the cover in position to afford ventilation through said additional openings past the cover.

2. In a wheel structure including a tire rim and a wheel body of the disk spider type, said wheel body having apertures in an intermediate annular portion thereof defined by axially inwardly extending reinforcing flanges, a cover for the outer side of the wheel including a circular body having an underturned marginal flange, said marginal flange having finger extensions therefrom including base portions extending generally radially inwardly and body portions extending generally axially inwardly alongside the flanges of the wheel openings and spaced from the opposite sides defining the openings so that the finger body portions can flex freely radially, each of said finger body portions having a divergent short retaining finger terminal flange engaging in retaining wedging engagement with the respective reinforcing flanges.

3. In a wheel structure including a tire rim and a wheel body of the disk spider type, said wheel body having apertures in an intermediate annular portion thereof defined by axially inwardly extending reinforcing flanges, a cover for the outer side of the wheel including a circular body having an underturned marginal flange, said marginal flange having finger extensions therefrom including base portions extending generally radially inwardly and body portions extending generally axially inwardly alongside the flanges of the wheel openings and spaced from the opposite sides defining the openings so that the finger body portions can flex freely radially, each of said finger body portions having a divergent short retaining finger terminal flange engaging in retaining wedging engagement with the respective reinforcing flanges, said fingers being of substantial width and of tapering side contour with the base portions wider than the body portions and with a reinforcing transverse rib at juncture of the base and body portions.

4. In a wheel structure including a tire rim and a load sustaining body of the disk spider type, the body having a central bolt-on flange portion and an annular generally axially outwardly extending nose bulge portion, said nose bulge portion having a plurality of annularly spaced apertures therein defined at one side by generally axially inwardly extending flanges providing faces engageable by retaining fingers of a cover disposed on the outer side of the wheel, and a cover for the outer side of the wheel with the fingers projecting through the apertures and retainingly engaging said faces.

5. In a wheel structure including a tire rim and a disk spider wheel body having a nose bulge portion, said nose bulge portion having a series of apertures therein for receiving retaining fingers on a cover, said apertures being defined on one radial side thereof with an inwardly directed flange formed integral in one piece with the wheel body and derived from the material struck out from the associated aperture, said flange providing at juncture with the wheel body a rounded shoulder providing a lead-in surface, and a cover for the outer side of the wheel having resilient retaining fingers cammingly slidable past said lead-in surfaces to extend into said apertures and retainingly engageable with said flanges.

6. In a wheel assembly including a tire rim and a disk spider wheel body having an outer marginal flange secured to the tire rim and with a portion of the wheel body spaced substantially radially inwardly from all portions of said marginal flange providing generally axially inwardly turned and extending flange structure disposed axially inwardly from and beyond the axially outer side of the wheel body and facing generally radially, and a hub cap overlying the central portion of the wheel body and of a diameter substantially smaller than the wheel body but large enough to overlie said flange structure marginally and having therebehind a series of generally axially inwardly extending radially resiliently deflectable retaining fingers having radially directed retaining terminals retainingly grippingly engageable with the radially facing surface of said flange structure.

References Cited in the file of this patent

UNITED STATES PATENTS

| | | |
|---|---|---|
| 1,410,506 | Rada | Mar. 21, 1922 |
| 1,875,907 | Zarobsky | Sept. 6, 1932 |
| 2,279,330 | Lyon | Apr. 14, 1942 |
| 2,551,327 | Horn | May 1, 1951 |
| 2,595,873 | Mulhern | May 6, 1952 |

FOREIGN PATENTS

| | | |
|---|---|---|
| 207,154 | Switzerland | Dec. 16, 1939 |
| 507,877 | Great Britain | June 22, 1939 |